United States Patent [19]

Moeken

[11] Patent Number: 5,301,819

[45] Date of Patent: Apr. 12, 1994

[54] COMPACT DISK STORAGE RACK

[76] Inventor: A. P. Moeken, Westeinde 48, 2841 BW Moordrecht, Netherlands

[21] Appl. No.: 16,746

[22] Filed: Feb. 11, 1993

[30] Foreign Application Priority Data

Feb. 17, 1992 [NL] Netherlands ............. 9200285

[51] Int. Cl.⁵ .................................. A47F 7/00
[52] U.S. Cl. ............................... 211/40; 211/72
[58] Field of Search ............. 211/40, 41, 11, 70.1, 211/72, 73, 13

[56] References Cited

U.S. PATENT DOCUMENTS

| | | | |
|---|---|---|---|
| 601,753 | 4/1898 | Kaiser | 211/87 X |
| 4,076,203 | 2/1978 | McDonnell | 248/250 X |
| 5,195,642 | 3/1993 | Dardashti | 221/40 X |

FOREIGN PATENT DOCUMENTS 9102999  8/1991  Fed. Rep. of Germany .

WO8600746  1/1986  PCT Int'l Appl. .

*Primary Examiner*—Alvin C. Chin-Shue
*Assistant Examiner*—Sarah A. Lechor
*Attorney, Agent, or Firm*—Peter L. Michaelson

[57] ABSTRACT

A storage rack for relatively flat objects (6), such as CD-cassettes, essentially consisting of two three-dimensional elements (10, 11), each element having been bent so as to form approximately a dihedral angle, in which at a fixed pitch distance a series of slotted recesses (3) are provided having a slot width corresponding to the height of the object (6) to be stored. The pitch distance of the recesses (3) is approximately twice the height of the object, the recesses (3) in one element (10) being staggered relatively to the recesses (3) in the other element (11) by half the pitch distance, in such a manner that the two elements (10, 11) can be slid one into the other with the angular points (12) turned towards each other.

5 Claims, 2 Drawing Sheets

COMPACT DISK STORAGE RACK

This invention relates to a storage rack for relatively flat objects, such as CD-cassettes, essentially consisting of an upwardly directed, form-retaining plate, in which at a fixed pitch distance a series or slotted recesses are provided having a slot width corresponding to the height of the object to be stored, the plate having been bent over about at least one longitudinal axis to form a three-dimensional element.

Such a storage rack is known from the magazine "Eigen Huis & Interieur" ("A House of One's Own & Interior"), Dec. 1991. This storage rack consists of a form-retaining plate, bent over to form a U-shaped section into which the rear edges of CD-cassettes can be clamped. Disposed on both sides of the CD-cassettes thus inserted into the bent U-shaped plate are upwardly directed rods, which retain the CD-cassettes in lateral direction. Consequently, the insertion and removal of CD-cassettes can take place in one direction only, namely, perpendicularly to the bent U-shaped plate. This means that between two adjacent CD-cassettes there should be sufficient interspace to enable a given CD-cassette to be removed from the storage rack. Therefore, a bearing rib present between two adjacent slotted recesses has a height which is approximately equal to the slot width. CD-cassettes have a height of 10.5 mm. This known storage rack has a height of 123 cm and is suitable for storing 48 CD-cassettes.

The object of the invention is to provide a storage rack in which more CD-cassettes can be stored per unit of height dimension, while sufficient removing space between adjacent cassettes is maintained.

This object is realized in that, according to the invention, a storage rack is provided comprising two three-dimensional elements, each element having been bent so as to form approximately a dihedral angle, the pitch distance of the recesses being approximately twice the height of the object and the recesses in one element being staggered relatively to the recesses in the other element by half the pitch distance, in such a manner that the two elements can be slid one into the other with the angular points turned towards each other.

In this manner, a storage rack is obtained into which CD-cassettes can be inserted from two opposite sides, while the space taken up by the bearing ribs between two adjacent recesses is utilized for inserting CD-cassettes into the rack from the other side thereof. In this manner, the "lost space", which must be reserved in the rack according to the prior art to permit the CD-cassettes to be inserted and removed, is disposed of and turned into useful storage space.

For the CD-cassettes to occupy a defined position when stored, the apex angle of the dihedral angle is approximately 90°. In this manner, one corner of a CD-cassette is precisely embraced by a bearing rib of the other three-dimensional element. For cassettes of a different shape, for instance a regular pentagon, this apex angle would be approximately 72°.

Preferably, the length of each slotted recess is at least equal to a quarter of the circumference of an object to be stored. In this manner, the centre of gravity of for instance a CD-cassette is located within the space enclosed by a bearing rib, so that the CD-cassette is not supported through clamping but rests on a supporting surface formed by the bearing rib.

The storage rack according to the invention can be suitable to be mounted on a wall, in which case mounting brackets are provided between the freely projecting side edges of the storage rack. In a standing design, the freely projecting side edges of the storage rack are each bent over 90° to form a box-shaped column, rectangular in section, of which the component parts are interconnected, the ends of these columns being mounted on a base.

Embodiments of the storage rack according to the invention will now be illustrated, by way of example only, with reference to the accompanying drawings. In said drawings.

Figure 1:
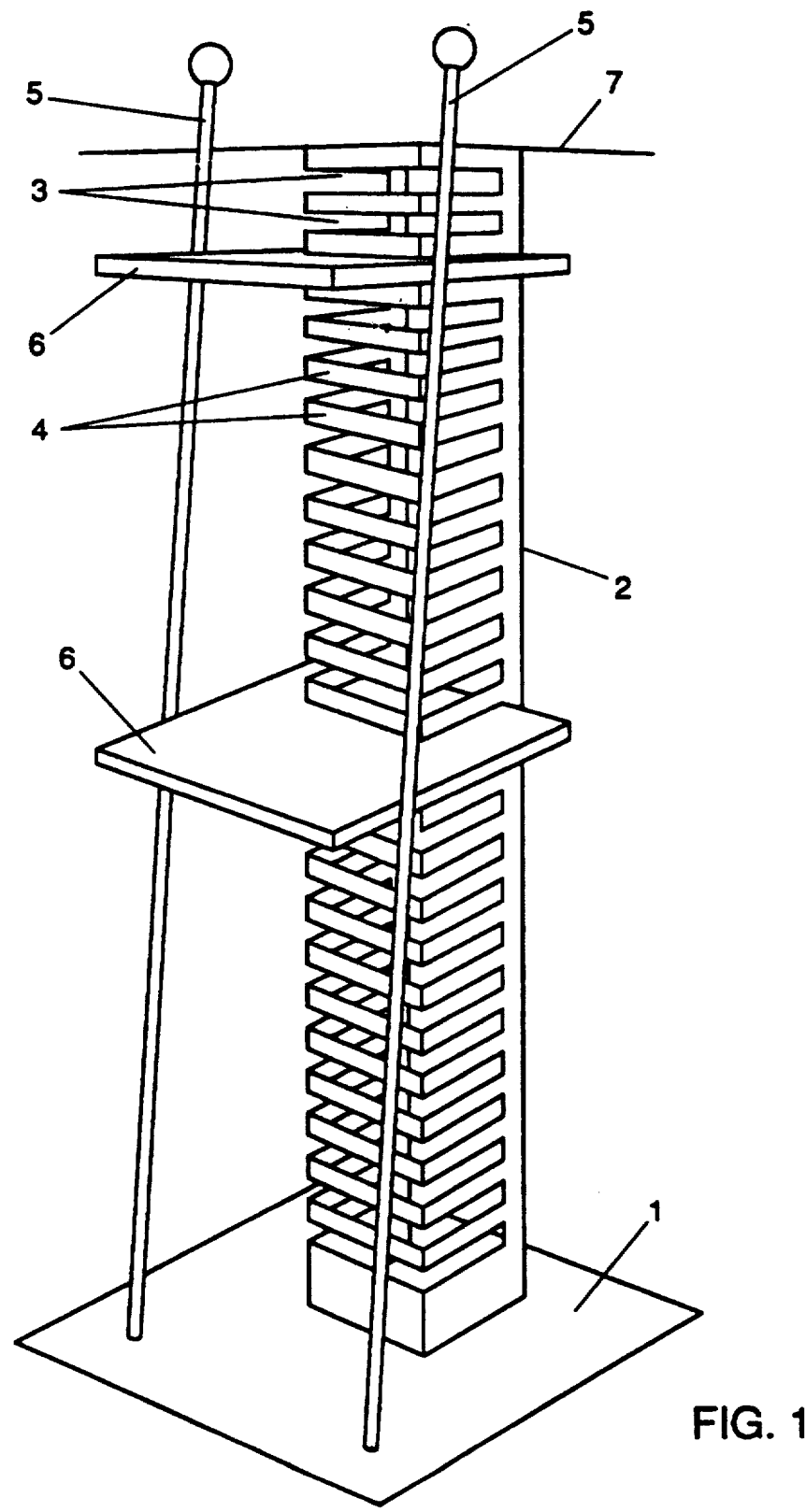
FIG. 1 is a storage rack according to the prior art.

The known storage rack according to FIG. 1 comprises a bent U-shaped plate 2, mounted on a supporting base 1. Provided at a fixed pitch distance in the bent U-shaped plate 2 are a series of slotted recesses 3, into which the rear edges of CD-cassettes can be inserted. Disposed between the slotted recesses 3 are bearing ribs 4 for supporting the CD-cassettes 6. The presence of the bearing ribs 4 ensures there is sufficient interspace between adjacent CD-cassettes so as to enable their removal from the rack. In inserted condition, the CD-cassettes 6 are retained on both sides by the rods 5, which are connected to the supporting base 1 and to a top plate 7. A thus designed storage rack of a height of 123 cm can accommodate 48 CDs, each having a height of 10.5 cm.

Figure 2:
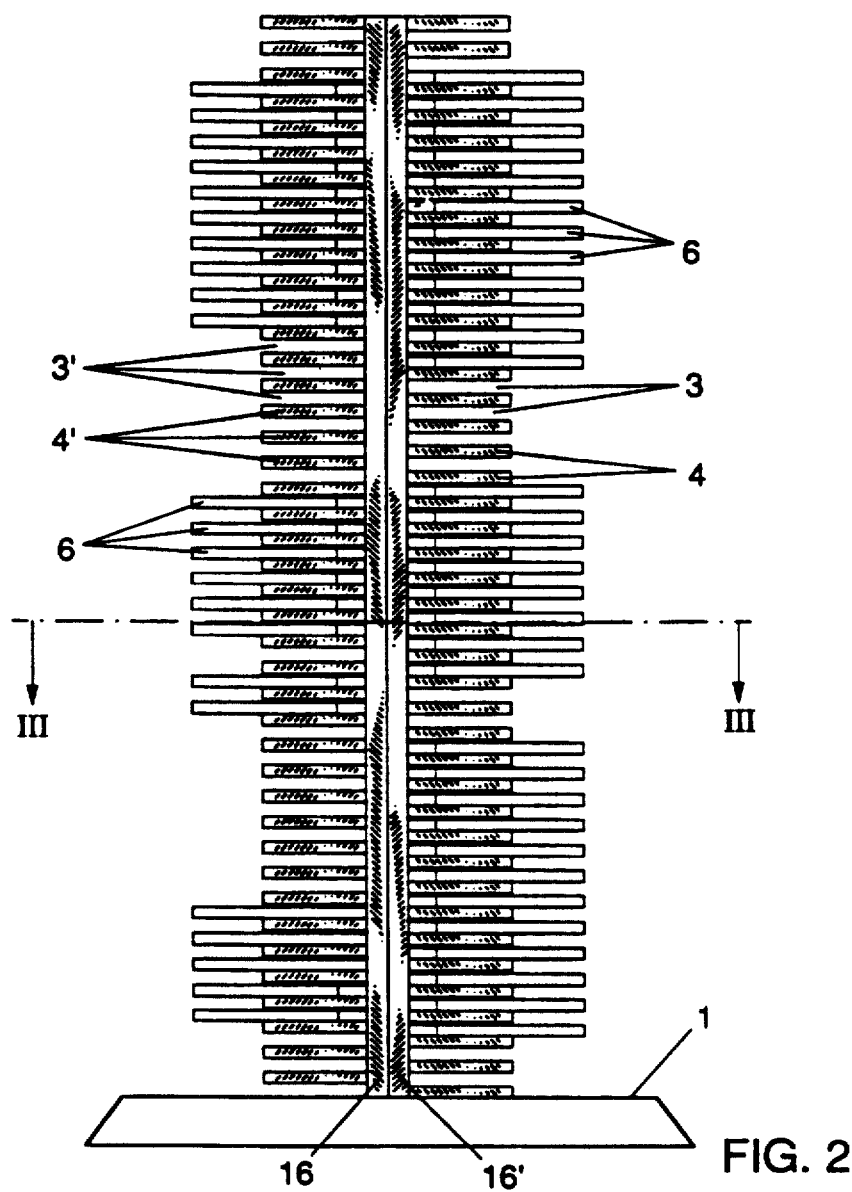
FIG. 2 is a front view of a storage rack according to the invention.
Figure 3:
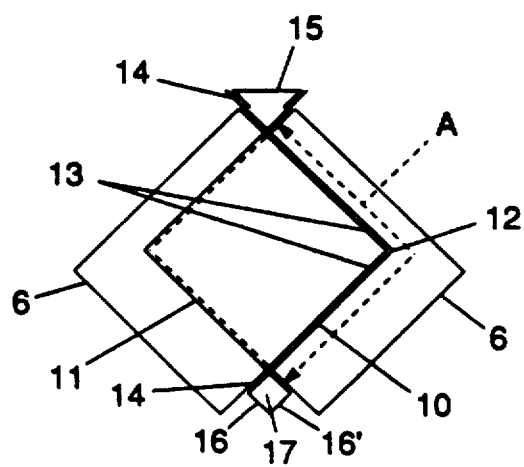
FIG. 3 is a section taken on the line III—III of the storage rack according to FIG. 2.

FIGS. 2-3 show the storage rack according to the invention, which permits CD-cassettes to be inserted both from the left and from the right. The storage rack consists of two form-retaining plates 10, 11, wherein at a fixed pitch distance slotted recesses 3 and 3', respectively, are provided. For CD-cassettes, each recess has a height of 11 mm and a length A of 200 mm, while the pitch distance is 21 mm. CD-cassettes have dimensions of 124×142 (1×w) and a height of 10.5 mm, so that each CD-cassette, inserted into a slotted recess 3, has a clearance of ½ mm. The form-retaining plates 10, 11 are bent over through an apex angle 13 of 90°, thereby forming an angular point or rib 12. The slotted recesses 3 of the plate 10 are staggered relatively to recesses 3' in the form-retaining plate 11 by half a pitch distance, so that the plates 10, 11 can be slid one into the other with the angular points turned towards each other, until the bearing ribs 4, disposed between the slotted recesses 3 of the plate 10, abut against the side edges of the slotted recesses 3' provided in the plate 11. In the case where the slot length is 200 mm and the dimensions of CD-cassettes are as indicated hereinabove, the centre of gravity of such a cassette is located within the space enclosed by the bent bearing rib 4, 4'. If the centre of gravity of the CD-cassette comes to lie outside the bent bearing rib 4, 4', the CD-cassettes in inserted condition will be clamped between two adjacent bearing ribs 4, 4', which is undesirable.

In order to enable the storage rack to be mounted on a wall, mounting brackets 15 can be provided between the freely projecting side edges 14 of the storage rack. These mounting brackets can be connected to the free edges 14 of the plates 10, 11, for instance by means of spot welding or in any other suitable manner.

In the standing design, the free side edges 14 are preferably bent over 90° again, yielding a box-shaped column 17 of rectangular section, bounded by the bent edges 16, 16' and the unbent portions of the free side edges 14. The edges 16, 16' can be interconneced in any suitable manner. The columns 17 can be fixedly mounted on a supporting base 1.

If the storage rack according to the invention shown in FIG. 2 has a height of 1,008 mm, it is capable of receiving 96 CD-cassettes, while maintaining the space between the CD-cassettes 6 for inserting or removing them. In fact, this inserting and removing space would not be necessary in the storage rack according to FIG. 2, because the cassettes can also be removed from and inserted into the rack by means of a lateral swivelling movement.

I claim:

1. A storage rack for relatively flat objects, such as CD-cassettes, essentially consisting of an upwardly directed, form-retaining plate, in which at a fixed pitch distance a series of slotted recesses are provided having a slot width corresponding to the height of the object to be stored, said plate having been bent over about at least one longitudinal axis to form a three-dimensional element, characterized in that the storage rack comprises two three-dimensional elements (10, 11), each element having been bent so as to form approximately a dihedral angle, the pitch distance of the recesses (3) being approximately twice the height of the object and the recesses (3) in one element (10) being staggered relatively to the recesses (3) in the other element (11) by half the pitch distance, in such a manner that the two elements (10, 11) can be slid one into the other with the angular points (12) turned towards each other.

2. A storage rack according to claim 1, characterized in that the apex angle (13) of the dihedral angle is approximately 90°.

3. A storage rack according to claim 1, characterized in that the length (A) of each slotted recess (3) is at least equal to a quarter of the circumference of an object to be stored.

4. A storage rack according to claim 1, characterized in that mounting brackets (15) are provided between the freely projecting side edges (14) of the storage rack.

5. A storage rack according to claim 1, characterized in that the freely projecting side edges (14) of the storage rack are each bent over 90° to form a box-shaped column (17) rectangular in section, of which the component parts (16, 16') are interconnected, the ends of said columns (17) being mounted on a supporting base (1).

* * * * *